United States Patent [19]

Yoshizawa

[11] Patent Number: 4,606,580
[45] Date of Patent: Aug. 19, 1986

[54] LOOSE-CUSHION SEAT
[75] Inventor: Toshio Yoshizawa, Akishima, Japan
[73] Assignee: Tachikawa Spring Co., Ltd., Tokyo, Japan
[21] Appl. No.: 709,441
[22] Filed: Mar. 8, 1985
[30] Foreign Application Priority Data Mar. 22, 1984 [JP] Japan .................. 59-55845

[51] Int. Cl.⁴ ............................................. A47C 23/00
[52] U.S. Cl. .............................. 297/458; 297/DIG. 1; 297/DIG. 2
[58] Field of Search ............ 297/458, DIG. 1, DIG. 2

[56] References Cited

U.S. PATENT DOCUMENTS

| 587,224 | 7/1897 | McKelvey | 297/458 X |
|---|---|---|---|
| 1,843,893 | 2/1932 | Becher | 297/DIG. 1 |
| 2,151,628 | 3/1939 | Van Derveer | 297/DIG. 1 |
| 2,821,243 | 1/1958 | Toulmin | 297/DIG. 1 |
| 3,537,752 | 11/1970 | Kushnarov et al. | 297/458 X |
| 3,649,974 | 3/1972 | Baruth et al. | 297/458 X |
| 4,332,419 | 6/1982 | Vogel | 297/DIG. 1 |

Primary Examiner—James T. McCall
Assistant Examiner—Laurie K. Cranmer
Attorney, Agent, or Firm—Darby & Darby

[57] ABSTRACT

A loose-cushion seat for use in a vehicle such as a bus, a passenger car or the like is disclosed which comprises a main pad provided with a skirt portion, a sub-pad placed on the main pad, a top member for covering the sub-pad. In the seat, the main pad is mounted such that it covers the outside surfaces of a seat frame. An insert wire is embedded in the skirt portion of the main pad and the end of the top member for covering the sub-pad is fixedly secured to the insert wire.

5 Claims, 6 Drawing Figures

LOOSE-CUSHION SEAT

BACKGROUND OF THE INVENTION

1. Field of the Invention

The present invention relates a vehicle seat, and, more particularly, to a so-called loose-cushion seat having a gorgeous and decorative cushion member fixedly placed thereon so as to provide better touch or improve in appearance.

2. Description of the Prior Art

A vehicle seat of this type is gorgeous in appearance and of high commercial value because a Japanese-cushion-like cushion member is placed on the seat, while such seat is disadvantageous in that it requires increased number of man-hour in manufacturing. For example, a conventional seat of this type as shown in FIG. 1(A) comprises a main pad (10), and a sub-pad (11) covered with a top member (12) and placed onto the main pad (10). In particular, the sub-pad (11) is fixed to the main pad (10) in such a manner that a hang cloth sewn to the end of a gore portion (12a) of the top member (12) is inserted through a groove (10a) formed in the main pad (10) and is then fixed by an S spring (14) extending across a frame (13) or the like. In this figure, reference numerals (15)(15) designate decorative buttons, respectively.

In another conventional seat as shown in FIG. 1(B), a cover (16) including a sub-pad (11') therein is placed over a main pad (10'), and then the ends of the cover (16) are fixedly secured to fixing members such as a frame (13) and the like. In such cover (16), the sub-pad (11') is enclosed by a top member (12') and a back cloth (12a'), and the end of a gore (12c') is secured through a small gore (12b') by a hog ring to fixing members such as a frame (13) and the like.

Accordingly, since the hang cloth is inserted through the groove (10a) of the main pad (10) and is then hung onto the S spring (14) located below the main pad (10), the first conventional seat shown in FIG. 1(A) is disadvantageous in that it requires the increased number of man-hour in assembling and also much labor in sewing, resulting in a poor working efficiency. Also, the second conventional seat in FIG. 1(B) is disadvantageous in that it provides a poor efficiency in sewing operation, since the sub-pad (11') must be enclosed by the top member (12'), back cloth (12a') and the like.

SUMMARY OF THE INVENTION

The present invention aims at eliminating the disadvantages found in the above-mentioned conventional seats.

Accordingly, it is a primary object of the invention to provide an improved loose-cushion seat which is easy to sew and assemble, provides for clear decorative wrinkles in the peripheries, and is of high commercial value.

In accomplishing the above object, according to the invention, an insert wire is embedded in the skirt portion of a main pad, and to this insert wire is fixed a top member for covering a sub-pad. Therefore, the invention can employ a single sheet of cloth for the portion of the top member that covers the sub-pad and thus eliminates the need of sewing together many sheets of cloth as in the prior art seats.

Further, according to another aspect of the invention, since the cloth covering the sub-pad is fixed by the insert wire and will not be drawn in by a gore potion sewn to the covering cloth and fixed at its end to a frame and the like, it is possible to maintain the cloth covering the subpad in its predetermined form.

In addition, according to further aspect of the invention, the main pad can be maintained in its predetermined configuration by means of the insert wire, so that the subpad of flexibility placed on the main pad is prevented against deformation or the like.

Other and further objects, features and advantages of the invention will appear more fully from the following description.

DETAILED DESCRIPTION OF A PREFERRED EMBODIMENT OF THE INVENTION

Figure 1A:
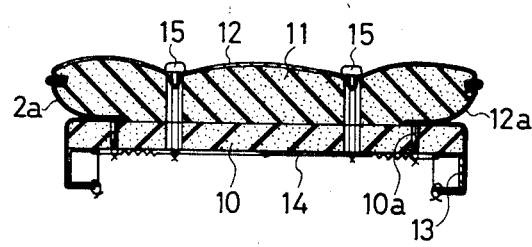
FIG. 1(A) is a longitudinal section view of a conventional seat.
Figure 1B:
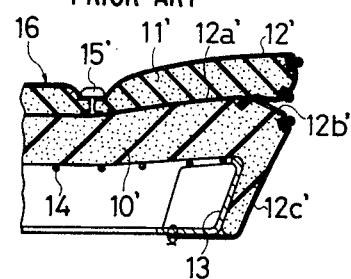
FIG. 1(B) is a partially enlarged section view of another conventional seat.
Figure 2:
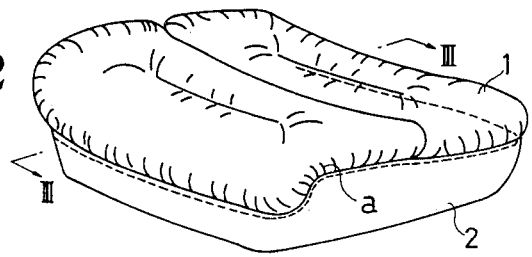
FIG. 2 is a perspective view of a loose-cushion seat contructed in accordance with the invention.
Figure 3:
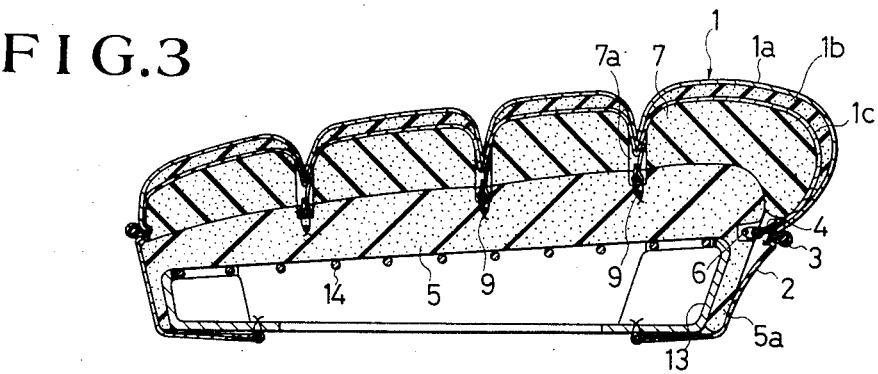
FIG. 3 is a section view taken along line III—III in FIG. 2.
Figure 4:
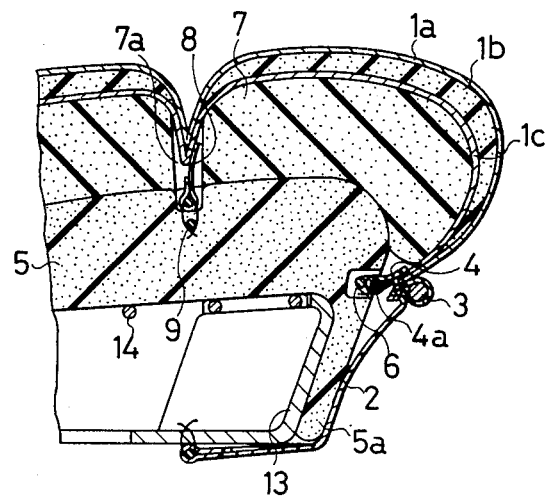
FIG. 4 is a partially enlarged view of FIG. 3.

FIGS. 2 to 4 respectively illustrate a cushion portion in a loose-cushion seat according to the invention, in which numeral (1) designates a loose portion of a top member, (2) represents a gore portion thereof. The loose portion (1) is so formed as to cover a sub-pad, while the gore portion (2) is sewn at one end thereof to the loose portion (1) along the peripheral edge of the loose portion (1) and is fixed at the other end thereof to a frame.

In forming the above-mentioned loose portion (1), a single sheet of cloth is sewn with gathers along its peripheral edges except one side thereof to provide a large number of wrinkles (a) for decoration at these peripheral edges. Thus, the single cloth is so formed as to be a kind of cap having the wrinkles (a) at the peripheral edges thereof. The gore portion (2) is sewn such that there may be produced no wrinkles at the end portions of the loose portion (1).

Referring now in detail to FIGS. 3 and 4, the illustrated loose portion (1) is composed of three layers, that is, a top cloth member (1a), a wadding (1b), a back cloth member (1c). The single sheet of cloth or the gore portion (2) is sewn through a bead member (3) to the ends of such three-layer loose portion (1), and a hang cloth (4) having a core member (4a) inserted therein is integrally sewn to the loose portion (1) adjacent to the back side of the bead member (3).

The upper surface of the loose portion (1) can be fixed in such a manner that a hang cloth (8) inserted into the through-bore (7a) of a sub-pad (7) is fixed by a hog ring to a wire (9) which is embedded adjacent to the upper surface of a main pad (5).

The sub-pad (7) is formed of a flexible slab foam member having a thickness of 50 mm or so and provides a feeling similar to a feather touch. This sub-pad (7) can be comressed down to several mm when an occupant is seated on it, and also can be restored quickly to its original state when the load is removed. Further, the sub-pad (7) is so formed as to be able to cover the upper portions of the sides of the main pad (5).

Figure 5:
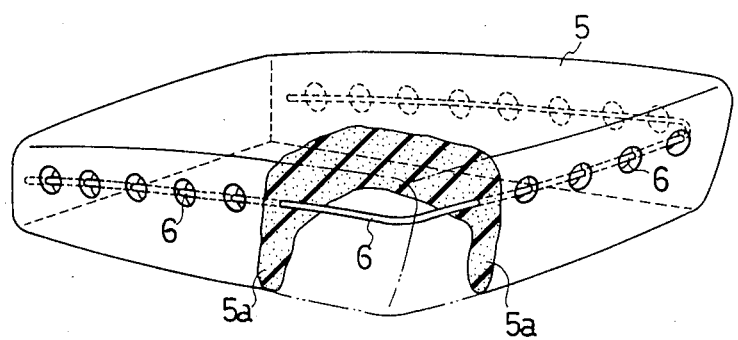
FIG. 5 is a partially cutaway perspective view of a main pad employed in the invention.

The main pad (5) comprises a foam member with a skirt portion (5a) formed by molding as in the prior art, and an insert wire (6) is embedded in a U-shaped configuration in the skirt portion (5a) such that it is partially exposed (FIG. 5). Also, there are embedded a plurality of wires (9) (9)—adjacent to the upper surface of the main pad (5) as shown in FIGS. 3 and 4, though not shown in FIG. 5. The main pad (5), like the conventional ones, is placed on a frame (13) or spring members (14) provided on the frame (13), such as S springs.

In assembly, the main pad (5) is first placed on the frame (13) and spring members (14) and, consequently, the side surfaces of the frame (13) are enclosed by the skirt portion (5a) of the main pad (5). Then, the sub-pad (7) is placed on the main pad (5) and is then covered with the top member or the loose portion (1) and the gore portion (2). Next, the top surface of the loose portion (1) is hung or drawn in to the wires (9) of the main pad (5) by means of hang cloth (8), and then the hang cloth (4) provided in the back side of the end of the loose portion (1) is secured by a hog ring or the like to the insert wire provided in the skirt portion (6) of the main pad (5). After then, if the end of the gore portion (2) is secured to the fixing member such as the frame (13) or the like, then the present seat is obtained.

Although the above-mentioned loose portion (1) has a three-layer structure including the top cloth (1a), wadding (1b) and back cloth (1c), the invention is not restricted to this, but, for example, it may be composed of a single sheet of member such as the top cloth (1a) only. Also, though the illustrated insert wire (6) is so formed as to have the U-shaped configuration extending along the skirt portion (5a) of the main pad (5), it may be formed in a frame-like configuration in case when the skirt portion (5a) is provided in the peripheries of the main pad (5). Further, while in the illustrated embodiment there is shown the structure of the cushion portion in the vehicle seat, it should be noted that the back portion thereof has a similar structure to this.

According to the invention, as described before, since the insert wire is embedded in the skirt portion provided in the peripheries of the main pad, the shape retaining property of the main pad is improved and thus the sub-pad placed on the main pad is improved in stability and will not lose shape even during long periods of use. Also, the portion of the top member that covers the sub-pad is secured to the insert wire, the sub-pad covering portion of the top member can be separated from the main pad covering portion thereof to form the loose-cushion seat. Therefore, a single sheet of cloth can be used to form the sub-pad covering portion of the top member, which eliminates the need to sew together a large number of sheets of cloth (such as the body, gore and the like of the top member) so as to enhance the working performance.

Further, because the sub-pad covering portion of the top member is fixed to the insert wire, that is, such top member portion will not be pulled by the gore portion of the top member, the sub-pad covering portion of the top member is able to retain its predetermined shape.

What is claimed is:

1. A loose-cushion seat for use in a vehicle, comprising:
   a seat frame;
   a main pad placed on said seat frame, said main pad having a skirt portion to cover the outside surfaces of said seat frame;
   a sub-pad placed on said main pad;
   a top member covering said sub-pad;
   a gore portion connected with said top member, said gore portion at a lower end portion thereof being fixedly secured to said seat frame;
   an insert wire embedded in said skirt portion of said main pad; and
   means defining in said skirt portion a plurality of portions for partially exposing said insert wire, whereby a peripheral end of said top member is partially secured through said means to said insert wire.

2. The loose-cushion seat for use in a vehicle according to claim 1, wherein said wire is formed in a U-shaped configuration extending along said skirt portion of said main pad.

3. The loose-cushion seat for use in a vehicle according to claim 1, wherein said wire is formed in a frame-shaped configuration extending along said skirt portion of said main pad.

4. The loose-cushion seat for use in a vehicle according to claim 1, wherein said means defining in said skirt portion a plurality of portions for partially exposing said insert wire comprise a plurality of spaced apart cutaways formed in said skirt portion in a direction identical to that of said insert wire.

5. The loose-cushion seat for use in a vehicle according to claim 1, wherein a portion of said top member adjacent to said peripheral end of said top member is connected by means of a bead member to an upper end portion of said gore portion.

* * * * *